UNITED STATES PATENT OFFICE.

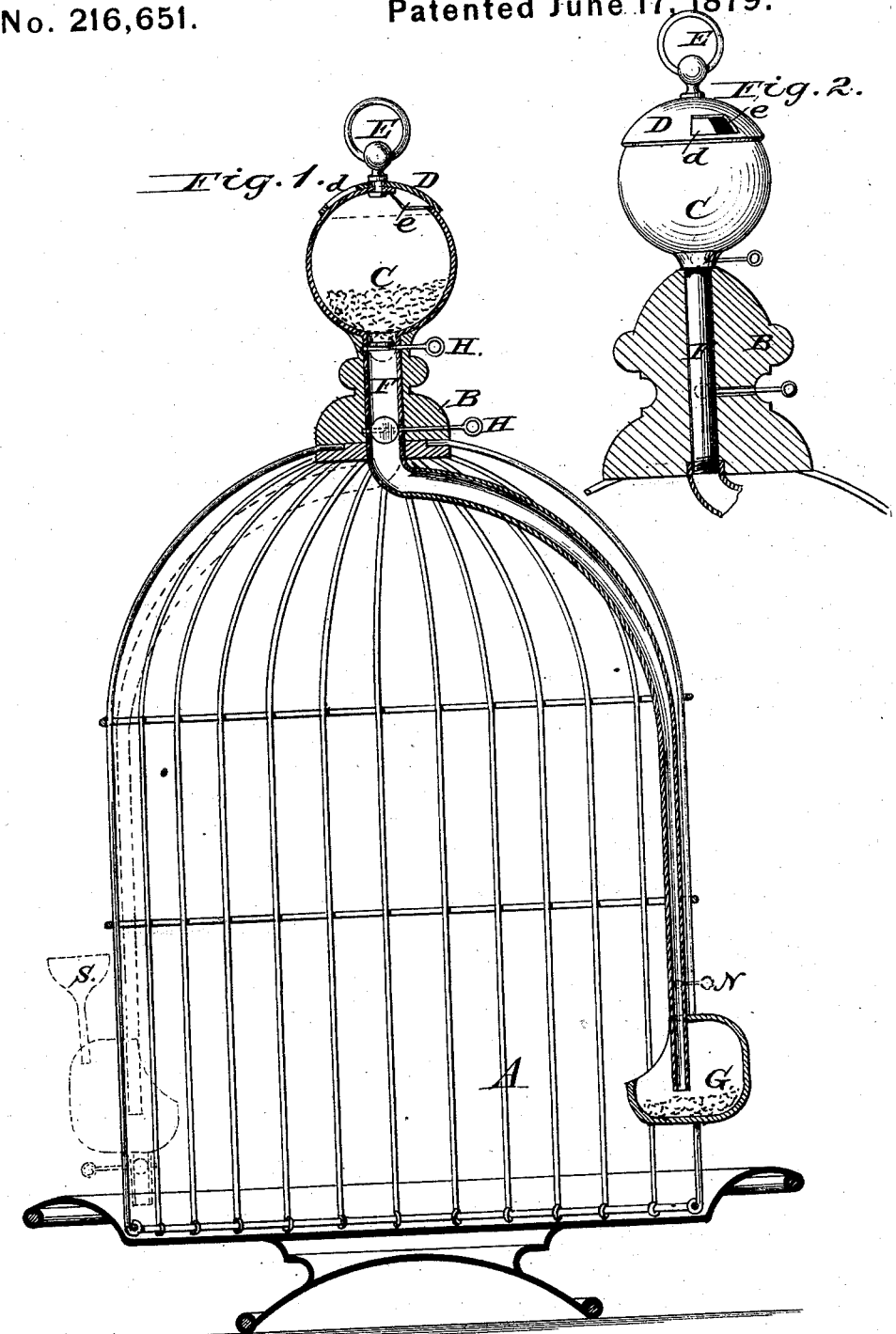

FRANCIS C. BOWEN, OF BROOKLYN, NEW YORK.

IMPROVEMENT IN FOOD-HOLDERS FOR BIRD-CAGES.

Specification forming part of Letters Patent No. 216,651, dated June 17, 1879; application filed November 23, 1878.

*To all whom it may concern:*

Be it known that I, FRANCIS CLARE BOWEN, of Brooklyn, in the county of Kings and State of New York, have invented certain new and useful improvements in receptacles for holding feed and supplying same to feed-cups of bird-cages, of which the following is a specification.

This invention relates to an improved device for supplying seed or other food to the seed-cup of a bird-cage; and it has for its object to provide for admitting to the feed cup or cups a limited quantity of food at suitable intervals, whereby the whole of the food will not be exposed at once to the attacks of the bird, thereby obviating the waste and dirt attendant upon the scattering of the food while the bird is feeding, as in the ordinary feed-cups.

To this end my invention consists in a receptacle or holder, of sufficient size to contain the desired quantity of food or seed, affixed to the cage, and provided with one or more downwardly-extending tubes provided with a valve or cock, or with valves or cocks, at such distances apart that the space between the same will form a measuring-chamber, and by means of which the seed or food may be supplied in limited and, if desired, regulated quantities to the seed cup or cups below, the lower end or ends of the tube or tubes terminating in the seed cup or cups for the purpose.

My invention further consists in the combination, with the seed-receptacle and the downwardly-extending tube or tubes, of an improved feed-cup having an opening at its bottom and a valve above the same, whereby the cup may be charged and the débris may be discharged without removing the device from the cage, as more fully hereinafter specified.

In the drawings, Figure 1 represents a sectional view of a bird-cage, showing my improvement applied thereto; and Fig. 2, a detached view of the upper part of a bird-cage, showing one method of applying my improved feeding device.

The letter A represents a bird-cage of any approved construction, and B a wooden, metallic, or other suitable crown, from which the upper ends of the wires diverge, and to which they are connected in any suitable manner.

The letter C represents the food-receptacle, which may be constructed of any suitable material, and of such form or design as fancy or taste may dictate. Said receptacle, in the present instance, is represented as constructed of globular or spherical shape, and is provided with a swiveled concavo-convex top, D, provided with an aperture, $d$, adapted to be brought into or out of conjunction with a similar opening, $e$, in the receptacle C, whereby the same may be charged and afterward closed.

Other forms of tops or covers may be employed, or the top may be omitted altogether, if desired, leaving the opening for charging uncovered.

The letter E represents a ring secured to the top of the receptacle, by means of which the same may be suspended from any suitable support. When said top is omitted its place may be supplied by a bail attached directly to the receptacle.

From the lower part of the receptacle extends a tube, F, which, in the present instance, passes through the crown of the cage, and to the lower end of which is secured, by means of a screw-thread, a continuation of said tube, said continuation being preferably bent to conform to the contour of the cage, and terminating in the seed-cup G. Said continuation may be formed of two or more branching pipes, as shown in dotted lines, (each branch terminating in a feed-cup,) if deemed desirable, and may be on the inside or outside of the cage.

The letters H H represent two valves or cocks, located at points in the tube F, or its extensions, at such distances apart that the space between the same will form a measuring-chamber, by means of which a regulated supply of food may be delivered to the seed cup or cups whenever desired.

The seed cup or cups may be of any ordinary or approved pattern; but I prefer to employ the cup constructed as shown in dotted lines in the drawings, with a tube extending downwardly from its bottom, and provided with a suitable valve or cock, by means of which the débris may be discharged from the cup without removing the same. In some cases the valves may be dispensed with entirely, or one alone employed. When the valves are entirely dispensed with the seed will collect in the seed-cup until the end of the tube is covered, which will stop further delivery until the cup is partially emptied by the bird, when its place will be automatically supplied. When but one valve is employed, as shown at N, Fig. 1, the food may be delivered at will in quantities, as desired, as the feed-cup becomes emptied.

In the present instance I have shown one means by which my invention may be applied to a bird-cage; but I do not intend to limit myself to such, as other forms may be adopted.

My invention has been described particularly in reference to the employment of granulated or powdered food or seed; but it is evident that it is equally applicable to the employment of liquid food or water. If desirable, water may be supplied through funnel, as shown in dotted lines at S.

The operation of my invention will be evident from the above without further description.

Having thus fully described my invention, what I claim, and desire to secure by Letters Patent, is—

1. A seed-holder or food-holder for bird-cages affixed to the cage and provided with one or more delivery-tubes extending over the seed-cup or seed-cups of said cage, whereby the food may be supplied to said cup or cups, substantially as and for the purposes specified.

2. The combination, with a bird-cage and its seed-receptacle and a seed-cup, of the delivery tube or tubes, and one or more valves arranged in said tube or tubes for controlling the delivery of the seed from the receptacle to the seed-cup, substantially as specified.

3. The combination of a cage, a seed-cup, a seed-receptacle, its delivery tube or tubes, and one or more valves located in said tube or tubes at such distances apart as to form a measuring-chamber to deliver the seed in regulated quantities to the seed cup or cups of said cage, substantially as specified.

4. In combination, with the seed-receptacle and its delivery tube or tubes, a seed cup or cups having a tube extending from the bottom and provided with a valve or cock, whereby the cup may be charged and the débris may be discharged without removing the cup or cups from the cage, substantially as specified.

In testimony that I claim the foregoing I have hereunto set my hand in the presence of the subscribing witnesses.

FRANCIS CLARE BOWEN.

Witnesses:
JAMES M. WRIGHT,
ALBERT H. NORRIS.